May 14, 1968     W. E. PALSER     3,383,511
HORIZON SCANNER WITH SPECIAL REFLECTOR
Filed June 18, 1963     4 Sheets-Sheet 1

*INVENTOR.*
WILLIAM E PALSER
BY Charles J. Ungemach
ATTORNEY

May 14, 1968 W. E. PALSER 3,383,511
HORIZON SCANNER WITH SPECIAL REFLECTOR
Filed June 18, 1963 4 Sheets-Sheet 3

INVENTOR.
WILLIAM E. PALSER
BY Charles J. Ungemach
ATTORNEY

May 14, 1968 W. E. PALSER 3,383,511
HORIZON SCANNER WITH SPECIAL REFLECTOR
Filed June 18, 1963 4 Sheets-Sheet 4

INVENTOR.
WILLIAM E. PALSER
BY Charles J. Ungemach
ATTORNEY

United States Patent Office 3,383,511
Patented May 14, 1968

3,383,511
HORIZON SCANNER WITH SPECIAL
REFLECTOR
William E. Palser, Inglewood, Calif., assignor to
Honeywell Inc., a corporation of Delaware
Filed June 18, 1963, Ser. No. 288,793
6 Claims. (Cl. 250—203)

This invention concerns an optical system for alignment of a body with respect to a source of radiation and although the invention has many uses as for example in an autocollimator, its use will be described herein in conjunction with a horizon scanner for an orbiting satellite.

In order to maintain a proper attitude with respect to a body about which a satellite is orbiting, it is necessary to know the exact direction of the center of that body. In recent years, a number of attempts to maintain an attitude with respect to the local vertical have been made utilizing the horizon of the body about which the satellite is orbiting as the reference. If it can be determined exactly where the horizon of the planet is, it is a mere matter of calculation to determine where the center of the planet is. To locate the horizon, a variety of scanning mechanisms, utilizing the difference in infrared radiation received from the planet or other body as compared with the cold space of the background have been devised. A number of these devices have utilized rotating mirrors or prisms in order to detect the position of the horizon, but due to the intense vacuum of space combined with the low temperatures encountered severe problems concerning lubrication have resulted.

In a copending application of Joseph E. Killpatrick, Ser. No. 101,238, filed Apr. 6, 1961, which is assigned to the assignee of the present invention, a horizon scanner which utilizes no moving parts is described. In the Killpatrick application, a reflecting cone is placed on the satellite operable to receive radiation from the horizon of the planet and to reflect the energy received therefrom so as to form on an image plane, an area substantially circular and void of any radiation indicative of the horizon of the planet. Four detectors are spaced around the image thus formed and are operable to compare radiation received. If the satellite is correctly oriented with respect to the planet each of the sensors will receive the same amount of radiation and a situation of equilibrium results. Should, however, the satellite change attitude with respect to the planet, the area of no radiation will move with respect to the detectors causing one or more of the detectors to receive more radiation and the opposite detector to receive less. This causes a signal to be created which is sent to control apparatus for purposes of realigning the satellite with respect to the local vertical.

One difficulty with the horizon sensor of the above mentioned copending Killpatrick application is that only a very limited change in altitude is allowable before the system becomes unoperable. Another difficulty is that at different altitudes a given change in attitude will produce different amounts of radiation change.

The present invention has as one of its objectives an increase in the altitude range over which the apparatus is useable. It is also an object of the present invention to provide a horizon sensor in which a given change in attitude will produce substantially the same change in output signal over a large range of altitudes.

Briefly, the invention comprises the use of a reflecting surface somewhat similar to that shown in the Killpatrick application except that the reflecting surface is curved in a novel manner. An image of the earth's horizon is reflected from the curved surface in such a manner as to produce a circular area indicative of the earth's horizon on an image plane. The optics of the system are arranged so that only light or infrared energy from the planet which is reflected from the cone parallel to the optical axis of the system to be utilized. All of the energy reflected parallel with the optic axis from the cone is directed by the lens system to a single detector which alternately scans opposite quadrants in order to detect difference in energy received in these opposite quadrants. If the satellite is correctly oriented with respect to the earth, the energy received by the detector in opposite quadrants will be equal and no output signal will result. Should however, the attitude of the satellite change with respect to the earth, a resultant output signal from opposite quadrants will be utilized to control the satellite in such a direction as to return it to the desired position. By utilizing a curved surface rather than a straight edged cone, an increase in altitude range is provided. When the curve is properly chosen as will be herein described, the amount of change of radiation received from opposite quadrants by the detector for a given change in attitude will be substantially the same throughout the altitude range.

A more complete understanding of this invention will be obtained upon a reading of the specification and claims when taken in conjunction with the drawings in which:

Figure 1:
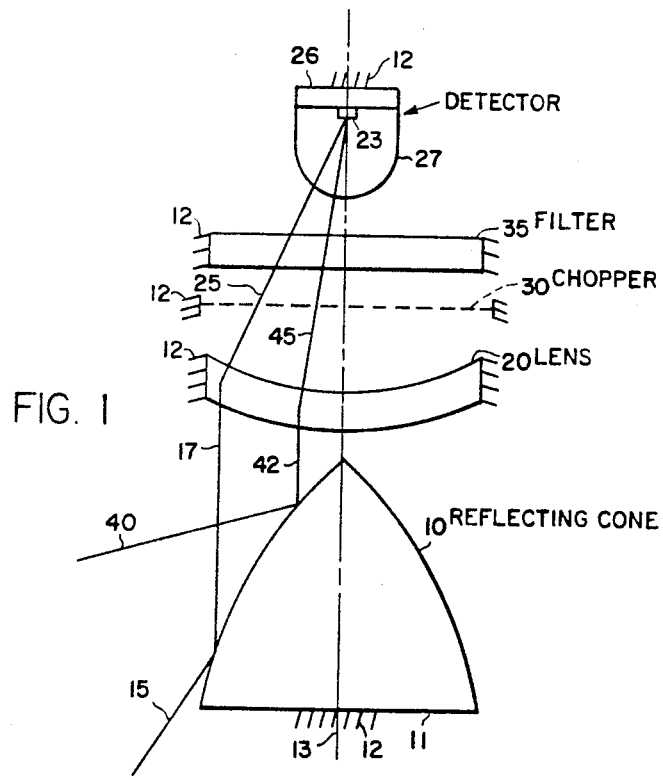
FIGURE 1 is a schematic representation of the optical system of the present invention.

While the present invention is perfectly operable with radiations of various kinds such as visible, ultraviolet or infrared, it will be described in the present invention as apparatus for use with a horizon sensor which receives infrared radiation from the earth. It is known that the earth will emit considerably more infrared radiation than space surrounding it since the space background will contain at most only a few stars at a very great distance. In FIGURE 1, a curved surface 10 of reflecting material is shown which may be mounted on the satellite 12 so that its base 11 will normally point towards the earth. The surface 10 has an optic axis 13 which it is desired to maintain along the local vertical so that it normally points directly towards the center of the earth. In FIGURE 1 infrared radiation from a point source on the earth's horizon is shown arriving at the reflecting surface 10 by means of a ray 15. The ray indicative of the infrared radiation from the horizon strikes the surface 10 and progresses in an upward manner as shown by ray 17 to a lens 20. Lens 20 is operable to cause ray 17 to be focused on a detector 23 as shown by ray 25. Lens 20 will direct only energy which is parallel to the optic axis 15 to the detector 23. Detector 23 may be a bolometer flake or any other type detector sensitive to infrared radiation and is shown mounted on the optic axis at the focal point of lens 20. As shown in FIGURE 1, the detector 23 is mounted on a base 26 and surrounded by a germanium casing 27. The immersion of the bolometer flake 23 in the germanium case 27 is for purposes of increasing the signal to noise ratio. A germanium casing 27 may have an antireflective coating on its front surface and may be shaped as a lens to increase the amount of radiation received by the bolometer flake 23. In some situations the germanium case 27 may be completely unnecessary and forms no part of the present invention.

The energy shown by ray 15 striking surface 10 and passing lens 20 by means of ray 17 and then to the detector 23 by means of ray 25 passes through a chopper shown schematically as dash line 30. Chopper 30 operates to periodically interrupt the radiation received by detector 23 in the various quadrants. The chopper will be more completely described in connection with FIGURE 6 but for the present it should be realized that chopper 30 will cause detector 23 to receive radiation first from one quadrant and then from an opposite quadrant, so that its output can be indicative of the difference between the radiation received from two opposing quadrants.

The energy from lens 20 passing through chopper 30 then passes through a filter 35 before arriving at the detector 23. The filter 35 is a bandpass device which limits the infrared signal to a predetermined range. It has been found that one of the most stable areas of infrared radiation from the earth is in the band between 14 and 16 microns. This stable band corresponds to one of the $CO_2$ bands radiating from the earth. The filter 35 thus operates to stabilize the infrared radiation received from the earth so as to minimize hot spots and the like which might develop from the various portions of the earth. The filter 35 may also be used to reject infrared radiation from extraneous sources such as the sun which may come into the field of view.

As described above, the ray 15 strikes the surface 10, is reflected parallel to the optic axis 13 and is focused by lens 20 through a chopper 30 and a filter 35 on a thermistor bolometer detector 23. The thermistor bolometer 23 will receive radiation first from one quadrant and then from the opposite quadrant and will produce a signal which is sent to an amplifier which compares the signals from the opposing quadrants and produces an output indicative of any difference therebetween. If the satellite 12 were at a different altitude ray 15 would not strike the surface and be reflected parallel to the optic axis 13 at the same point as above described. For example if the satellite 12 were to be at a lower altitude a point on the horizon might emit energy along a ray 40 which would strike the surface 10 and be reflected parallel to the optic axis as shown by ray 42. It is seen that the point on which energy from the horizon of the earth strikes the surface 10 depends upon the altitude of the satellite with respect to the earth. The ray 42 reflected off surface 10 from ray 40 at a lower altitude will be focused onto bolometer 23 as shown by ray 45 in FIGURE 1. It can be seen that at a low altitude radiation over a greater portion of the surface 10 is received by the bolometer 23 than at the higher altitude. This can be more readily understood with respect to FIGURES 2 and 3.

Figure 2:
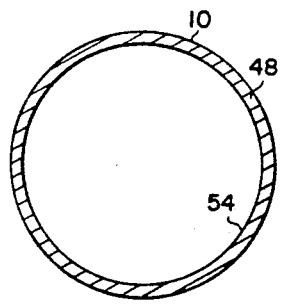
FIGURE 2 is a top view of the cone of FIGURE 1 showing the radiation received at a first altitude.
Figure 3:
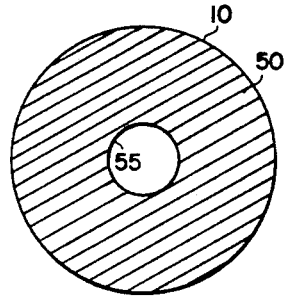
FIGURE 3 is a second top view of the cone of FIGURE 1 showing the radiation received at a second altitude.

In FIGURE 2 a top view is shown indicating on the surface 10 a shaded area 48. This shaded area corresponds to the radiation received by the surface 10 when at a relatively high altitude and it is seen that radiation is received only over a small portion of the surface. In FIGURE 3 the surface 10 is shown as it might exist at a lower altitude and the radiation received is indicated by the shaded portion 50. It is seen that at the low altitude a greater amount of radiation is received by the surface than at a high altitude. In each case however, the inner edge of the shaded area will indicate the horizon of the earth. In FIGURE 2 this inner diameter has been indicated by reference numeral 54 and in FIGURE 3 the inner diameter is indicated by reference numeral 55. Since, however, the ultimate signal developed by the bolometer 23 in conjunction with the chopper 30 does not operate in accordance with total amount of radiation received but only with the difference in radiation received between opposing quadrants, the fact that more radiation is received from the surface 10 at low altitude than at high altitude makes no substantial difference to the operation of the system.

Figure 4:
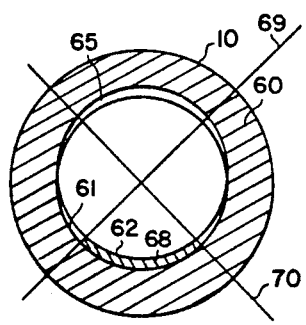
FIGURE 4 is a third top view of the cone of FIGURE 1 showing how a change in attitude affects the radiation received by the apparatus of FIGURE 1.

The configuration shown in FIGURES 2 and 3 are indicative of the radiation as seen from above the surface 10 when the satellite is correctly oriented with respect to the earth. Should, however, the satellite change orientation so that the optic axis 13 of the surface 10 points not directly at the center of the earth, the inner diameter 54 of FIGURE 2 and 55 of FIGURE 3 will move in a direction opposite to that in which the satellite is misoriented. FIGURE 4 shows this situation when the satellite moves to an incorrect attitude. In FIGURE 4 the surface 10 is shown with a dark area 60 indicative of the radiation received by the surface. A first inner diameter 61 is shown which indicates the horizon of the earth when the satellite is correctly oriented. A second inner diameter 62 is shown indicating the horizon of the earth when the optic axis is misaligned by a certain amount. A light area 65 shown in the upper portion of FIGURE 4 indicates that no radiation is being received in this area whereas before misorientation occurred radiation was being received. The shaded portion 68 shown in the lower quadrant of FIGURE 4 indicates an area where radiation is now being received from the surface 10 and in which no radiation was being received when the satellite was correctly oriented. It will be observed that the sum of areas 65 and 68 will be indicative of the difference in radiation received by the upper and lower quadrants in FIGURE 4. To show the four quadrants which are being observed by the detector 23, crossed perpendicular lines 69 and 70 have been drawn in FIGURE 4. The detector 23 will develop a signal which is amplified and demodulated. The demodulated signal will be proportional to the amount of radiation in the upper quadrant of FIGURE 4. This signal will be compared to the signal generated by the amount of radiation received in the lower quadrant of FIGURE 4. When there is misorientation as shown, the detector 23 will receive more radiation from the lower quadrant and less from the upper quadrant. The difference between the proportional signal levels becomes the output signal which is used for purposes of reorienting the satellite as will be later discussed.

In spite of the shift in radiation received on the surface 10, no significant difference in radiation will be received in the two horizontal quadrants of FIGURE 4. Consequently, no reorientation of the satellite in this direction will result. However, should the satellite tilt in such a manner that the inner diameter 61 were to shift to the left in FIGURE 4, then there would be a difference in radiation received in the two horizontal quadrants. The signals from detector 23 would then cause reorientation of the satellite with respect to the earth in the horizontal axis of FIGURE 4 to bring the amount of radiation received back into equality among the various sectors.

Figure 5:
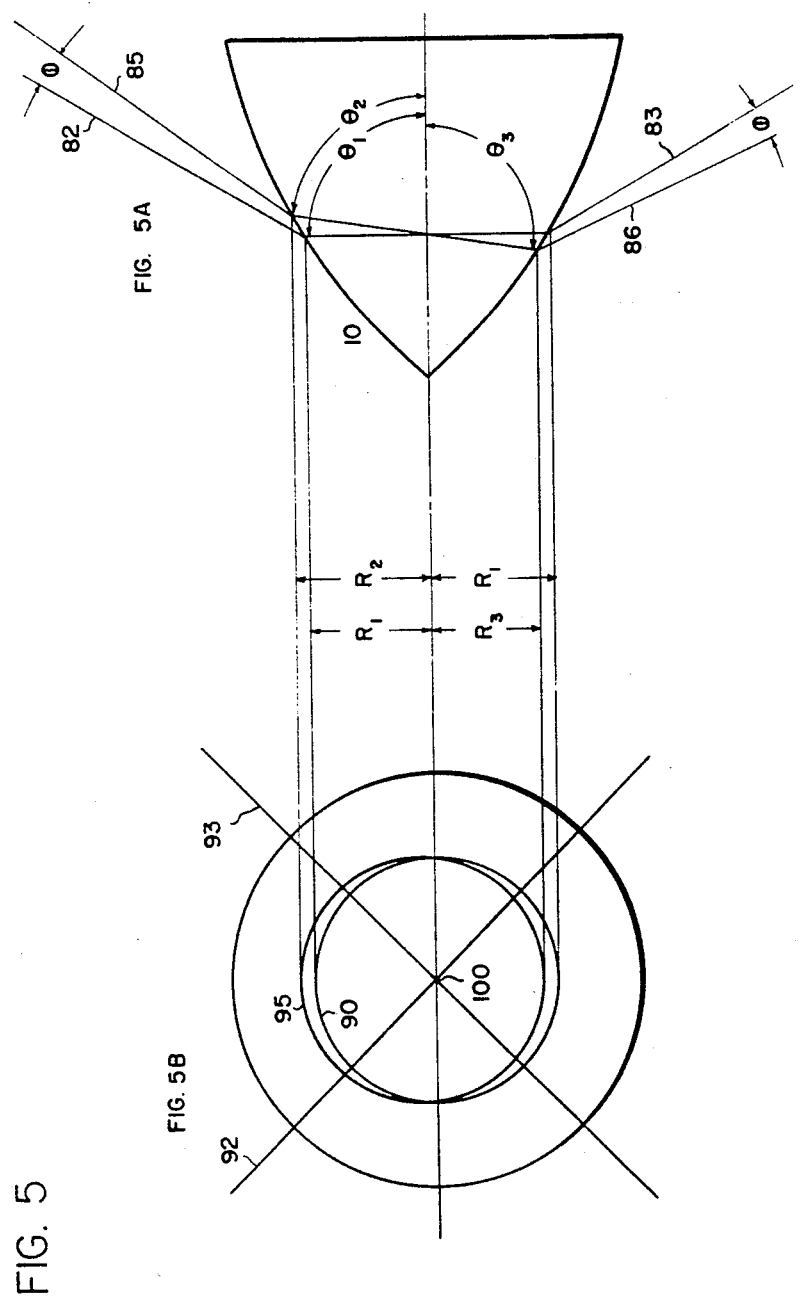
FIGURE 5 is a partly schematic view of the optics of the cone including a side view of the cone in FIGURE 5A and a top view of the cone in FIGURE 5B, to show the various angles which accompany a change in attitude of the cone with respect to the source of radiation.

Attention is now directed to FIGURE 5 which shows the surface 10 in FIGURE 5A receiving radiation from the horizon along rays 82 and 83 when the satellite is correctly oriented and receiving rays from the horizon along lines 85 and 86 when the cone is misaligned by an amount of $\theta$ with respect to the local vertical. The angle between rays 82 and 85 is thus $\theta$ and is equal to the angle between rays 83 and 86. In FIGURE 5 the lens system, the chopper and filter have been eliminated for simplicity. Ray 82 representing the horizon ray when the satellite is correctly oriented is reflected from the surface 10 parallel to the optic axis and causes an image to appear in FIGURE 5B of a circle defined by a reference numeral 90. Sector lines 92 and 93 have been drawn in FIGURE 5B to indicate the opposing quadrants in the amount of radiation received thereby. The circle 90 is indicative of the horizon of the earth when the cone is correctly oriented and the radius of the circle $R_1$ is equal to the distance from the optical axis to the point where ray 82 strikes surface 10. It can be seen that the radiation received in opposing quadrants is equal and no reorientation of the satellite is necessary. When the satellite is misaligned by an angle $\theta$, the rays 85 and 86 strike the surface 10 at new locations and are reflected parallel to the optic axis so as to appear in FIGURE 5B as an approximate circle 95 displaced slightly upwardly from circle 90. It should be noted at this point that due to the curvature of the cone in FIGURE 5A the approximate circle 95 will be more in the nature of an ellipse but, for small errors the figure will be almost circular and will hereinafter be considered circular. The center of the circle 90 is shown in FIGURE 5B as point 100. For purposes of simplifying the mathematics involved it will be assumed that the center of the approximate circle 95, it also point 100 although actually it is displaced. For small errors it can be assumed that the center of both circles are the same.

It can be seen from FIGURE 5B that the area between the approximate circle 95 and the circle 90 in the upper quadrant between will be $$\frac{\pi}{4}(R_2^2 - R_1^2)$$

and the area between the circles in the lower quadrant will be $$\frac{\pi}{4}(R_1^2 - R_3^2)$$

The total area change is thus $$\frac{\pi}{4}(R_2^2 - R_1^2) + \frac{\pi}{4}(R_1^2 - R_3^2)$$

This area change is proportional to the difference in radiation received which determines the signal output from the demodulator used to cause correction of the alignment of the satellite.

It can also be seen from FIGURE 5B that should the satellite increase or decrease in altitude the diameters of circles 90 and 95 would increase or decrease accordingly. It is desirable to have the same output signal for a given angle of misalignment $\phi$ regardless of the altitude of the satellite. This can only be accomplished if the change in area, $\Delta$ area, in opposing quadrants for a given change in attitude, $\Delta\phi$, is caused to remain constant over the entire range of altitude. In other words the apparatus should maintain $\Delta\phi/\Delta$ area constant with altitude. This can be accomplished in accordance with the present invention by shaping the surface 10 according to the equation $$\theta_x = \theta_{max} - (\theta_{max} - \theta_{min})\left(\frac{R_x}{R_{max}}\right)^2$$

where $\theta_x$ is the surface angle at the point where the horizon ray strikes the surface 10 to be reflected parallel with the optic axis, $\theta_{max}$ is the maximum surface angle which is that angle at the apex end of the surface, $\theta_{min}$ is the minimum surface angle which is that angle formed by the surface at the base end of the surface, $R_x$ is the radius from the optic axis to the point where the horizon ray strikes the surface and $R_{max}$ is the maximum radius which is equal to the distance from the optic axis to the surface at the base. As used herein, the term surface angle means the angle which the surface makes with the optic axis at any particular point.

Substituting the values of $R_1$ and $R_2$ into the above equation where $R_1$ corresponds to the radius from the optic axis to the point on surface 10 where ray 82 meets the surface and where the surface angle is $\theta_1$ and $R_2$ corresponds to the distance from the optic axis to the point on surface 10 where ray 85 strikes the surface and where the surface angle is $\theta_2$, the following equation results:

$$\theta_1 = \theta_{max} - (\theta_{max} - \theta_{min})\frac{R_1^2}{R_{max}^2}$$

$$\theta_2 = \theta_{max} - (\theta_{max} - \theta_{min})\frac{R_2^2}{R_{max}^2}$$

It can be shown that the surface angles $\theta_1$ and $\theta_2$ where rays 82 and 85 meet the surface 10 are related to the misalignment angle $\phi$ such that $\phi$ is proportional to $\theta_1 - \theta_2$. In like manner, $\phi$ is also related to the surface angles $\theta_1$ and $\theta_3$ where rays 83 and 86 strike the surface 10 such that $\phi$ is proportional to $\theta_3 - \theta_3$. Substracting the equations for $\theta_1$ and $\theta_2$ above:

$$\theta_1 - \theta_2 = (\theta_{max} - \theta_{min})\frac{(R_2^2 - R_1^2)}{R_{max}^2}$$

Since $\phi$ is proportional to $\theta_1 - \theta_2$, $\Delta\phi/\Delta$ area is proportional to $$\frac{(\theta_{max} - \theta_{min})\left(\frac{R_2^2 - R_1^2}{R_{max}^2}\right)}{\frac{\pi}{4}(R_2^2 - R_1^2)}$$

or $\Delta\phi/\Delta$ area is proportional to $$(\theta_{max} - \theta_{min})\frac{4}{\pi R_{max}^2}$$

It is seen that the equation above is constant as was desired. By similar substitution the change in area in the lower quadrant of FIGURE 5B may also be shown to be constant.

Thus, by shaping the cone according to the equation $$\theta_x = \theta_{max} - (\theta_{max} - \theta_{min})\left(\frac{R_x}{R_{max}}\right)^2$$

we obtained in FIGURE 5B area changes in the upper and lower quadrants which are substantially constant for various altitudes and for a given misalignment $\phi$.

Figure 8:
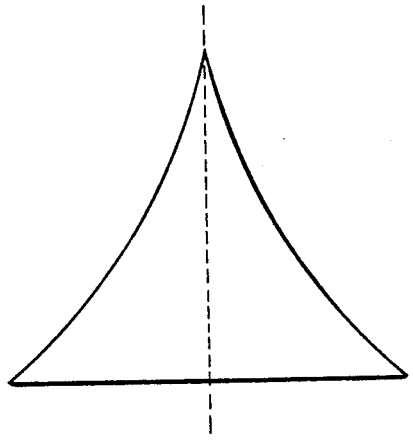
FIGURE 8 is a showing of another possible shape for the cone of FIGURE 1.

I have also found that the equation $$\theta_x = \theta_{min} + (\theta_{max} - \theta_{min})\left(\frac{R_x}{R_{max}}\right)^2$$

produces constant $\Delta\phi/\Delta$ area. This equation is substantially the opposite of the first equation and would describe a surface having the same curvature but bending inwardly toward the axes as shown in FIGURE 8. The operation would be the same as above described except that where an image annular is presently formed near the base at high altitudes it would be formed near the apex of the surface of FIGURE 8 at high altitudes and vice versa. A slight weight advantage is gained using the surface of FIGURE 8 but there is a possible limit on angular view and the shape might be more difficult to manufacture so at present the shape of the surface 10 in FIGURE 1 is the preferred embodiment.

It should be realized that an approximation was made in the above mathematical analysis that the circles 95 and 90 were concentric and that the circle 95 was actually a circle. While in reality this is not quite true, for small errors it is approximately true so that the equation for the surface of the cone define above produces an output which is linear over a 20 degree misalignment angle to within 10%. This is deemed adequate for the present invention and shows that by curving the cone according to the above relationship the amount of radiation change received for a given angular misalignment can be maintained substantially constant throughout the desired altitude range.

$\theta_{min}$ and $\theta_{max}$ are chosen for particular altitude ranges. For a surface having a $\theta_{min}$ of 30 degrees and a $\theta_{max}$ of 42.5 degrees, an altitude range of 145 to 640 kilometers is obtained. For different altitude ranges $\theta_{max}$ and $\theta_{min}$ would have to be chosen dicerently. $R_{max}$ is chosen so that the base of the cone is the same radius as the aperture of the lens.

Figure 6:
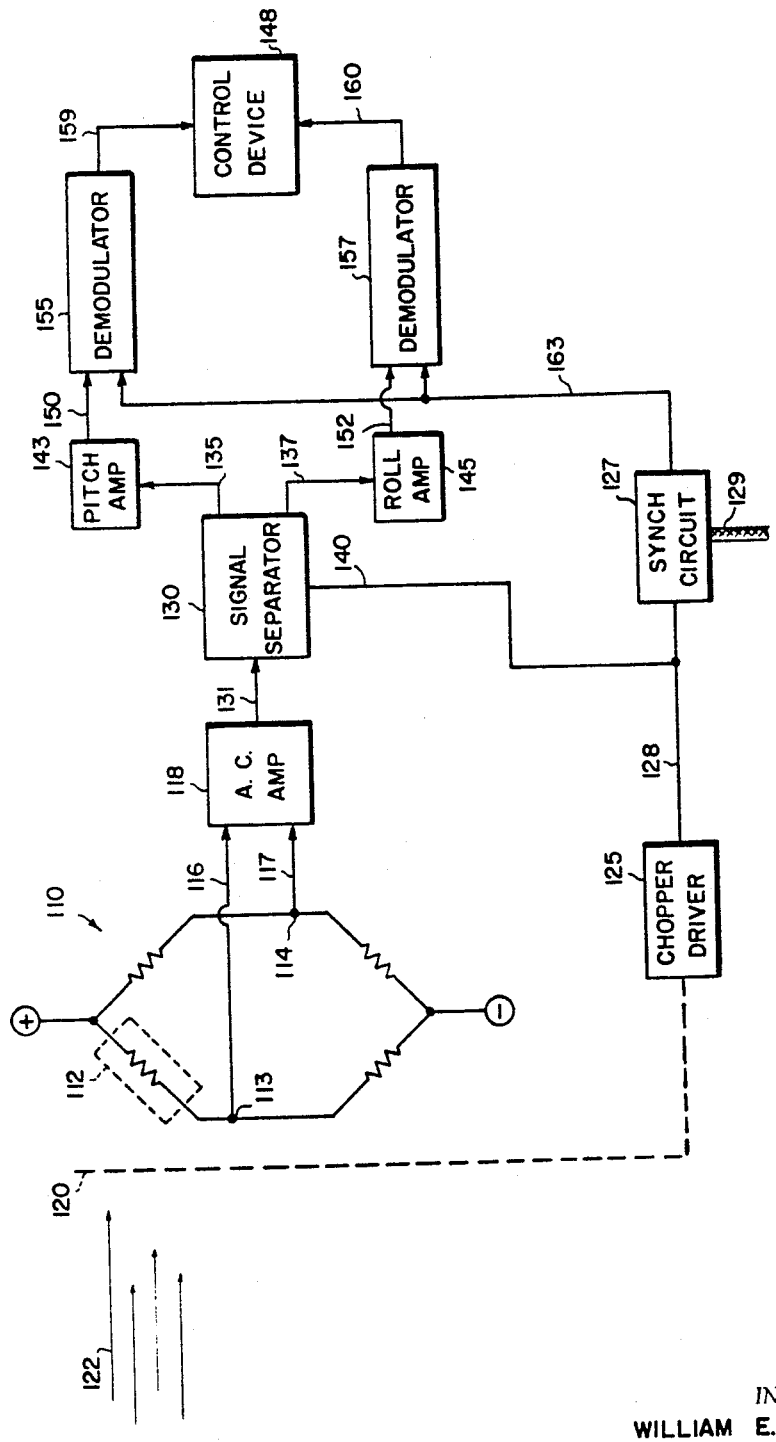
FIGURE 6 is a block drawing showing the detection and control circuits of the present invention.

The apparatus for utilizing the signals from bolometer 23 in FIGURE 1 will now be described in connection with FIGURE 6. In FIGURE 6 a bridge circuit generally shown as 110 has three resistors in addition to the sensing bolometer shown incased by dash lines 112. The bridge is energized by sources of potential indicated as plus and minus and an output is produced on terminals 113 and 114 which is presented by lines 116 and 117 to an AC amplifier 118. The output of bridge 110 will be an alternating signal of frequency dependent upon the frequency of the chopper. In FIGURE 6 the chopper is shown by dash line 120 interrupting the radiation shown by arrows 122 to the detector 112. The chopper 120 is actuated by a chopper driver shown as 125 which in turn is energized by a synchronous circuit 127 by means of a conductor 128. The synch circuit 127 is shown having a power input on line 129. As previously mentioned, the chopper operates to expose the detector 112 to radiation in opposite quadrants so that the AC amplifier will receive a signal on lines 116 and 117 indicative of radiation received by the detector in these opposite quadrants. This signal is amplified by amplifier 118 and presented to a signal separator 130 by means of a line 131. Signal separator 130 operates to separate signals from the first and third quadrants from signals received from the second and fourth quadrants and produces an output on line 135 indicative of the signals from the first and third quadrants and an output on line 137 indicative of the signals from the second and fourth quadrants. To provide a reference for the signal separator 130 a connection from the synch circuit 127 is made by a conductor 140. Synch circuit 127 operates to control the signal separator 130 in synchronism with chopper 125 so as to separate the input signals on line 131 into two categories, that of the first and third or pitch quadrants and that of the second and fourth or roll quadrants. Thus, any signal on line 135 will be indicative of an error in attitude in the pitch axis and any signal on line 137 will be indicative of an error in the roll axis. These signals are sent respectively to a pitch amplifier 143 and a roll amplifier 145 which produce amplified outputs indicative of pitch and roll errors respectively on lines 150 and 152. These signals are then sent to demodulators 155 and 157 to produce DC outputs indicative of pitch and roll errors respectively on lines 159 and 160. The reference signal input for the demodulators 155 and 157 is provided by the synch circuit 127 by means of a conductor 163. The output on lines 159 and 160 will be DC signals indicative of any errors from correct alignment of the satellite with respect to the earth. A signal on conductor 159 will be sent to a control device 148 for controlling the attitude of the satellite about the pitch axis whereas the signal on output 160 will provide a signal for the control device 168 to control the satellite about the roll axis. The polarity of the signal on outputs 159 and 160 are indicative of the direction of misalignment. The control device 148 may be any standard satellite control apparatus such as reaction jets.

Figure 7:
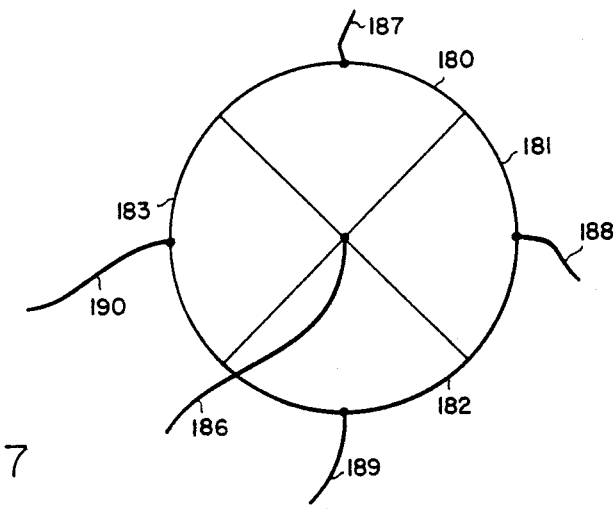
FIGURE 7 is a showing of one embodiment of a chopper for use in the present invention.

Referring now to FIGURE 7, a chopper is shown which is operable in the present system to cause the detector to be alternately exposed to first and third quadrant signals and then to second and fourth quadrant signals. In FIGURE 7 four pie-shaped sections of material have been shown identified with reference numerals 180, 181, 182, and 183. These pie-shaped sections fit together to form a substantially complete circle and may be composed of the material germanium. Germanium has the property with regard to infrared radiation that when an alternating potential is applied across it, it may become alternately opaque and transparent to infrared radiation. To supply potentials across the four pieces of germanium 180 through 183, a central or common conductor 186 is employed with individual conductors 187, 188, 189, and 190 to the individual segments. By applying a potential across conductors 188 and 186, 189 and 186, and 190 and 186 for example, pie-shaped section 180 will be transparent, while pie-shaped sections 181, 182, and 183 may be caused to be opaque to infrared radiation. By then applying a potential across conductors 187 and 186 and removing the potential across conductors 186 and 189 pie-shaped section 182 may then become alternately opaque and transparent. Thus, by properly energizing pie-shaped sections 180 and 182, these sections may become alternately opaque and transparent in opposite fashion so that in the first instance section 180 is transparent and 182 is opaque. The resultant signal seen by the detector is alternately the radiation received by the opposite quadrants 180 and 182 to produce an output signal from the detector of magnitude which varies with this radiation. The phase of the signal from the bolometer detector 23 of FIGURE 1 after passing through the chopper shown in FIGURE 7 will be in effect two signals of opposite phase and of magnitude dependent upon the radiation in the opposite sectors. After sections 180 and 182 have been made alternately opaque and transparent for a period of time in FIGURE 7, these two sections will be made opaque and sections 181 and 183 will alternately be made opaque and transparent. In like manner, the signals will be sent to the signal separator 130 of FIGURE 6 indicative of errors in the roll axis. The synch circuit of 127 of FIGURE 6 may be a standard timer which supplies signals to the chopper driver to cause first sections 180 and 182 to be alternately opaque and transparent and then after a predetermined time make sections 181 and 183 alternately opaque and transparent. At the same time signals are sent to the signal separator 130 in synchronism with the signals sent to the chopper driver 125 so that at any one time the outputs from the signal separator are either indicative of errors in the pitch axis or errors in the roll axis. As stated previously, these signals are demodulated by the demodulators 155 and 157 to create DC signals on 159 and 160 which are fed to the control device 106 of the satellite for purposes of re-establishing the proper orientation.

Of course, instead of the germanium chopper shown in FIGURE 7, a mechanical chopper which alternately exposed opposite quadrants for a period of time and is then rotated 90 degrees to expose the second set of opposite quadrants would be suitable. Many other modifications of the present invention will become obvious to those skilled in the art and I do not intend to be limited to the specific disclosure used and concerned with the preferred embodiment. I intend only to be limited by the following claims.

I claim:

1. A reflector comprising a reflecting surface of revolution having first and second ends, having an axis and having a surface defined substantially according to the relationship $$\theta_x = \theta_{min} - (\theta_{max} - \theta_{min})\left(\frac{R_x}{R_{max}}\right)^2$$

where $\theta_x$ is the surface angle relative to the axis at a point on the surface, $\theta_{max}$ is the surface angle at the first end, $\theta_{min}$ is the surface angle at the second end, $R_{max}$ is the distance between the axis and the surface at the second end and $R_x$ is the distance between the axis and the point on the surface where $\theta_x$ is measured.

2. A reflector comprising a closed reflecting surface of revolution having first and second ends, having an axis and having a surface defined substantially according to the relationship $$\theta_x = \theta_{min} + (\theta_{max} - \theta_{min})\left(\frac{R_x}{R_{max}}\right)^2$$

where $\theta_x$ is the surface angle between the surface and the axis at a point on the surface, $\theta_{max}$ is the surface angle at the first end, $\theta_{min}$ is the surface angle at the second end, $R_{max}$ is the distance between the axis and the surface at the first end and $R_x$ is the distance between the axis and the point on the surface where $\theta_x$ is measured.

3. A reflector having a closed reflecting surface of revolution characterized with a shape which approximates the relationship $$\theta_x = \theta_{max} - (\theta_{max} - \theta_{min})\left(\frac{R_x}{R_{max}}\right)^2$$

where $\theta_x$ is the surface angle between the surface and the axis of revolution at any point on the surface, $R_x$ is the distance from the axis of any corresponding point on the surface, $\theta_{max}$ is the largest surface angle in the surface, $\theta_{min}$ is the smallest surface angle on the surface and $R_{max}$ is the greatest distance from any point on the surface to the axis.

4. A horizon scanner comprising:
a body having a reflectorized closed surface of revolution according to claim 3 mounted to receive radiant energy from a celestial body, and reflect it parallel with the axis of the surface of revolution; and
energy detecting means mounted to receive the energy reflected from said surface of revolution and to produce an output indicative of the radiation received.

5. A reflector having a closed reflecting surface of revolution characterized with a shape which approximates the relationship $$\theta_x = \theta_{min} + (\theta_{max} - \theta_{min})\left(\frac{R_x}{R_{max}}\right)^2$$

where $\theta_x$ is the surface angle relative to the axis of revolution at any point on the surface, $R_x$ is the distance from the axis of revolution of any corresponding point on the surface, $\theta_{max}$ is the largest surface angle in the surface, $\theta_{min}$ is the smallest surface angle on the surface and $R_{max}$ is the greatest distance from any point on the surface to the axis.

6. A horizon scanner comprising:
a body having a closed surface of revolution according to claim 5 mounted to receive radiant energy from a celestial body, and reflect it parallel with the axis of the surface of revolution; and
energy detecting means mounted to receive the energy reflected from said surface of revolution and to produce an output indicative of the radiation received.

References Cited
UNITED STATES PATENTS

| | | | |
|---|---|---|---|
| 1,747,928 | 2/1930 | Chesney | 88—57 |
| 2,198,014 | 4/1940 | Ott | 88—57 |
| 2,424,193 | 7/1947 | Rost et al. | 250—203 X |
| 2,776,367 | 1/1957 | Lehovec | 250—211 |
| 2,929,923 | 3/1960 | Lehovec | 250—211 |
| 3,015,034 | 12/1961 | Hanlet | 250—211 |
| 2,674,700 | 4/1954 | Small | 250—216 |
| 2,966,823 | 1/1961 | Trimble | 250—203 X |
| 3,147,335 | 9/1964 | Guerth | 88—57 |
| 3,201,591 | 8/1965 | Froelich | 250—203 X |
| 3,226,557 | 12/1965 | Goodman. | |
| 3,230,376 | 1/1966 | Goetze et al. | 88—1 |
| 3,234,843 | 2/1966 | Killpatrick | 88—1 |

FOREIGN PATENTS

| | | |
|---|---|---|
| 658,260 | 2/1963 | Canada. |

RALPH G. NILSON, *Primary Examiner.*

ARCHIE R. BORCHELT, *Examiner.*

M. A. LEAVITT, E. STRICKLAND,
*Assistant Examiners.*

UNITED STATES PATENT OFFICE

CERTIFICATE OF CORRECTION

Patent No. 3,383,511                 May 14, 1968

William E. Palser

It is certified that error appears in the above identified patent and that said Letters Patent are hereby corrected as shown below:

Column 8, lines 56 to 58, the equation should appear as shown below:

$$\theta_x = \theta_{max} - (\theta_{max} - \theta_{min})\left(\frac{R_x}{R_{max}}\right)^2$$

Signed and sealed this 27th day of January 1970.

(SEAL)
Attest:

Edward M. Fletcher, Jr.                WILLIAM E. SCHUYLER, JR.

Attesting Officer                     Commissioner of Patents